(12) United States Patent
Kato et al.

(10) Patent No.: US 8,922,693 B2
(45) Date of Patent: Dec. 30, 2014

(54) IMAGING APPARATUS CAPABLE OF CONCURRENTLY SHOOTING IMAGE DISPLAYED BY DISPLAY AND DETERMINED SUB-AREA DESIGNATED IN THE IMAGE

(71) Applicant: Olympus Imaging Corp., Shibuya-ku, Tokyo (JP)

(72) Inventors: Shigeru Kato, Tachikawa (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 69 days.

(21) Appl. No.: 13/728,627

(22) Filed: Dec. 27, 2012

(65) Prior Publication Data

US 2013/0169849 A1    Jul. 4, 2013

(30) Foreign Application Priority Data

Dec. 28, 2011    (JP) .................................. 2011-289809

(51) Int. Cl.
*H04N 5/222*    (2006.01)
*H04N 5/232*    (2006.01)

(52) U.S. Cl.
CPC .............................. *H04N 5/23293* (2013.01)
USPC ............ 348/333.01; 348/333.02; 348/333.03; 348/333.04

(58) Field of Classification Search
None
See application file for complete search history.

(56) References Cited

U.S. PATENT DOCUMENTS

| 7,538,795 | B2 * | 5/2009 | Shibatani et al. | 348/208.16 |
| 2007/0014551 | A1 * | 1/2007 | Fujisawa et al. | 396/20 |
| 2010/0053364 | A1 * | 3/2010 | Mino et al. | 348/222.1 |
| 2010/0086293 | A1 * | 4/2010 | Iwane | 396/91 |
| 2011/0019058 | A1 * | 1/2011 | Sakai et al. | 348/333.01 |
| 2011/0050972 | A1 * | 3/2011 | Ishitsuka et al. | 348/333.01 |
| 2011/0157404 | A1 * | 6/2011 | Shiohara | 348/222.1 |
| 2012/0120277 | A1 * | 5/2012 | Tsai | 348/223.1 |
| 2012/0188413 | A1 * | 7/2012 | Park | 348/240.99 |
| 2012/0249818 | A1 * | 10/2012 | Asakura et al. | 348/222.1 |
| 2014/0085525 | A1 * | 3/2014 | Ishihara et al. | 348/333.02 |

FOREIGN PATENT DOCUMENTS

JP    05-252440    9/1993

* cited by examiner

*Primary Examiner* — Lin Ye
*Assistant Examiner* — John H Morehead, III
(74) *Attorney, Agent, or Firm* — John C. Pokotylo; Straub & Pokotylo

(57) ABSTRACT

An imaging apparatus is capable of concurrently shooting an image displayed by a display and a determined sub-area designated in the image. The imaging apparatus includes an optical system that collects light from a subject for image formation, an imaging device that generates image data by photoelectrically converting the light, a display that can display an image corresponding to the image data, an input unit, an effective region determination unit that determines an effective region in which the determined sub-area can be set through input of a signal from the input unit, based on characteristic information of the optical system corresponding to a shooting condition, and a display control unit that causes the display to display information indicating the effective region in accordance with a result of determination by the effective region determination unit.

16 Claims, 11 Drawing Sheets

FIG.2

| | | FOCAL LENGTH (mm) | | | | |
|---|---|---|---|---|---|---|
| | | 28 | 38 | 48 | 58 | ... |
| DIAPHRAGM VALUE (F) | 2.0 | 0.8 | 0.8 | 0.8 | 0.9 | ... |
| | 2.4 | 0.8 | 0.8 | 0.9 | 1.0 | ... |
| | 2.8 | 0.8 | 0.9 | 1.0 | 1.0 | ... |
| | ... | ... | ... | ... | ... | ... |

IMAGING APPARATUS CAPABLE OF CONCURRENTLY SHOOTING IMAGE DISPLAYED BY DISPLAY AND DETERMINED SUB-AREA DESIGNATED IN THE IMAGE

CROSS-REFERENCE TO RELATED APPLICATIONS

This application is based upon and claims the benefit of priority from Japanese Patent Application No. 2011-289809, filed on Dec. 28, 2011; the entire contents of which are incorporated herein by reference.

BACKGROUND OF THE INVENTION

1. Field of the Invention

The present invention relates to an imaging apparatus that shoots an image of a subject and generates image data of the subject.

2. Description of the Related Art

There is conventionally known cameras capable of generating two different images from a shot image and combining these images into an image on a single screen for display (for example, see Japanese Laid-open Patent Publication No. 5-252440). With this technique, an image signal of a first region that is a partial region in the shot image screen and an image signal of a second region included in the first region are extracted, and the image signal of the second region is enlarged to the size of the region excluding the first region and is then combined with the image signal of the first region, whereby an image signal for display on a single screen is generated.

SUMMARY OF THE INVENTION

According to one aspect of the present invention, there is provided an imaging apparatus capable of concurrently shooting an image displayed by a display and a determined sub-area designated in the image, the imaging apparatus including: an optical system that collects light from a subject for image formation; an imaging device that generates image data by photoelectrically converting the light for image formation collected by the optical system; a display that can display an image corresponding to the image data; an input unit; an effective region determination unit that determines an effective region in which the determined sub-area can be set through input of a signal from the input unit, based on characteristic information of the optical system corresponding to a shooting condition; and a display control unit that causes the display to display information indicating the effective region in accordance with a result of determination by the effective region determination unit.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram illustrating an overview of a table for multi-recording effective region determination that is recorded by a main body of the imaging apparatus according to the embodiment of the present invention;

DETAILED DESCRIPTION OF THE PREFERRED EMBODIMENTS

In the following, a mode for carrying out the present invention (hereinafter, referred to as an "embodiment") will be described with reference to the appended drawings.

Figure 1:
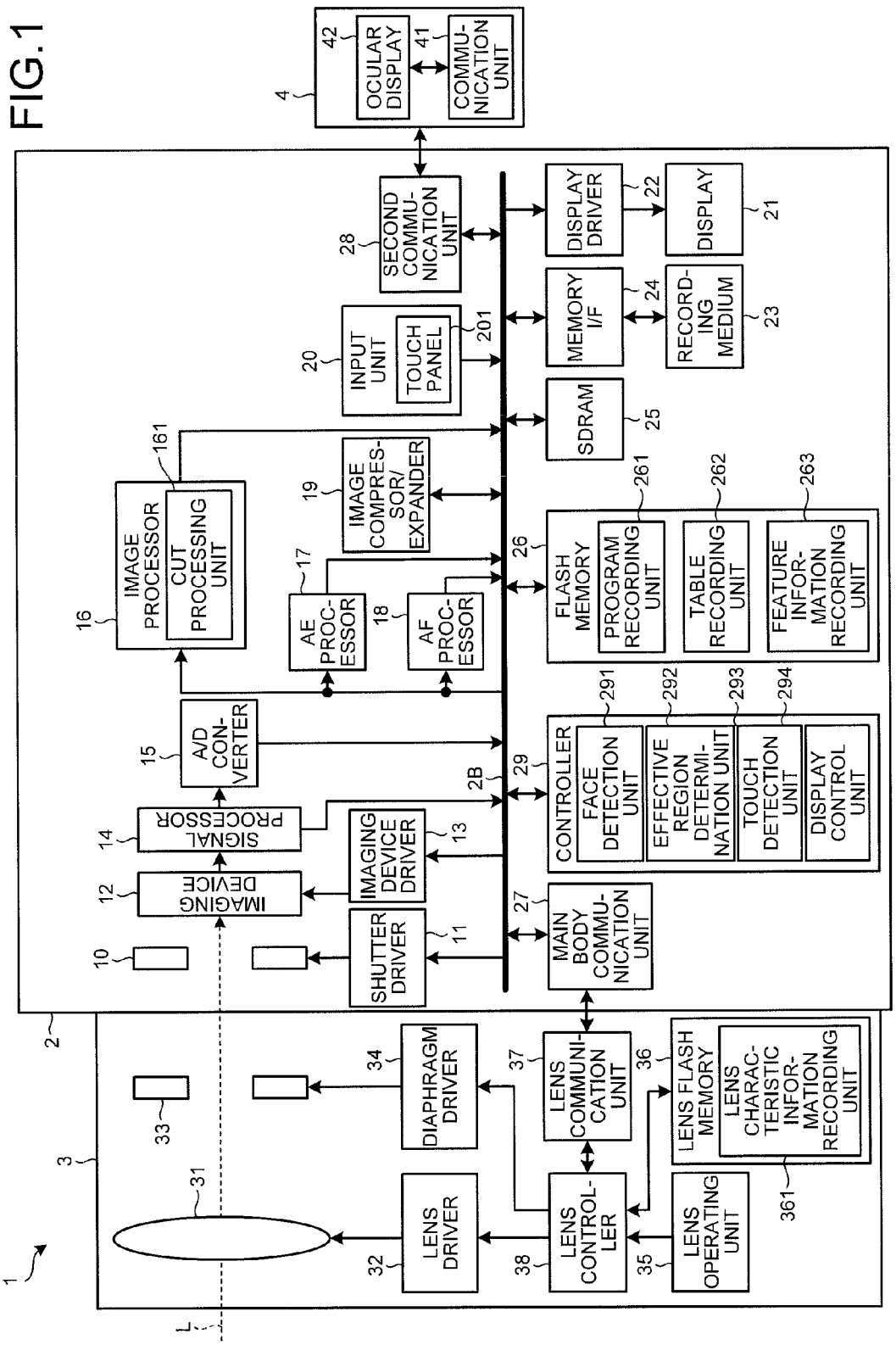
FIG. 1 is a block diagram illustrating a configuration of an imaging apparatus according to an embodiment of the present invention.

FIG. 1 is a block diagram illustrating a configuration of an imaging apparatus 1 according to an embodiment of the present invention. The imaging apparatus 1 illustrated in FIG. 1 is a lens interchangeable imaging apparatus including a main body 2 and a lens unit 3 (interchangeable lens) removably attached to the main body 2. An accessory 4 can also be removably attached to the main body 2 of the imaging apparatus 1.

The main body 2 includes a shutter 10, a shutter driver 11, an imaging device 12, an imaging device driver 13, a signal processor 14, an analog/digital (A/D) converter 15, an image processor 16, an auto exposure (AE) processor 17, an auto focus (AF) processor 18, an image compressor/expander 19, an input unit 20, a display 21, a display driver 22, a recording medium 23, a memory interface (I/F) 24, a Synchronous Dynamic Random Access Memory (SDRAM) 25, a Flash memory 26, a main body communication unit 27, a second communication unit 28, and a controller 29. Data in the main body 2 is transferred through a bus 2B.

The shutter 10 sets the imaging device 12 to an exposure state or a light blocking state. The shutter driver 11 is configured using, for example, a stepping motor to drive the shutter 10 in response to an instruction signal input from the controller 29.

The imaging device 12 is configured using, for example, a Charge Coupled Device (CCD) or a Complementary Metal Oxide Semiconductor (CMOS) to receive light collected by the lens unit 3 and convert the received light into an electrical signal. The imaging device driver 13 causes the imaging device 12 to output image data (analog signal) to the signal processor 14 at a predetermined timing. In this sense, the imaging device driver 13 functions as an electronic shutter.

The signal processor 14 performs analog processing on the analog signal input from the imaging device 12 and outputs the processed signal to the A/D converter 15. Specifically, the signal processor 14 performs a noise reduction process, a gain-up process, etc. on the analog signal. For example, the signal processor 14 performs waveform shaping on the analog signal after reducing reset noise and then performs gain-up to achieve the intended brightness.

The A/D converter 15 generates digital image data by performing A/D conversion on the analog signal input from the signal processor 14 and outputs the generated image data to the SDRAM 25.

The image processor 16 acquires image data from the SDRAM 25 and performs a variety of image processing on the acquired image data (RAW data) to generate processed image data. The processed image data is output to the SDRAM 25.

The image processor 16 has a cut processing unit 161 for determining a determined sub-area (cut region) in a display image based on a signal input from the input unit 20. The image processor 16 performs basic image processing on the image data, at least including an optical black subtraction process, a white balance (WB) adjustment process, if the imaging device is in Bayer arrangement, an image data synchronization process, a color matrix operation process, a gamma correction process, a color reproduction process, and an edge enhancement process.

The AE processor 17 acquires image data recorded on the SDRAM 25 and sets exposure conditions for still image shooting or movie shooting, based on the acquired image data. Specifically, the AE processor 17 performs automatic exposure of the imaging apparatus 1 by calculating luminance from the image data and determining, for example, a setting value of diaphragm value (F-number) and a shutter speed based on the calculated luminance.

The AF processor 18 acquires image data recorded on the SDRAM 25 and adjusts the auto focus of the imaging apparatus 1 based on the acquired image data. For example, the AF processor 18 adjusts the auto focus of the imaging apparatus 1 by extracting a signal of high frequency components from the image data and performing an Auto Focus (AF) operation process (also called a contrast AF process) on the signal of high frequency components to determine focusing evaluation of the imaging apparatus 1.

The image compressor/expander 19 acquires image data from the SDRAM 25, compresses the acquired image data in a predetermined format, and outputs the compressed image data to the SDRAM 25. Here, examples of the predetermined format include Joint Photographic Experts Group (JPEG), Motion JPEG, and MP4 (H.264). The image compressor/expander 19 also acquires image data (compressed image data) recorded on the recording medium 23 through the bus 2B and the memory I/F 24 and expands the acquired image data for output to the SDRAM 25. In place of the recording medium 23, a storage may be provided in the inside of the imaging apparatus 1.

The input unit 20 is provided to overlay a display screen of the display 21 and has a touch panel 201 for accepting input of a signal in accordance with a position of touch from the outside. The input unit 20 is implemented using a user interface including the touch panel 201 for operation signal input. The input unit 20 in this manner includes a release button for accepting input of a shooting signal during still image shooting, an operation button for switching a variety of settings, a menu button for causing the display 21 to display a variety of settings of the imaging apparatus 1, and a movie button for giving an instruction to shoot movies, for example.

The display 21 is configured using, for example, a display panel formed of liquid crystal or organic Electro Luminescence (EL). The display driver 22 acquires image data stored in the SDRAM 25 or image data stored in the recording medium 23 and causes the display 21 to display an image corresponding to the acquired image data. Here, display of images includes REC view display of displaying image data for a predetermined time (for example, three seconds) immediately after shooting, playback display of playing back image data recorded on the recording medium 23, and live view display of successively displaying live view images in time sequence in accordance with image data successively generated by the imaging device 12. The display 21 also displays operation information of the imaging apparatus 1 and information concerning shooting, as appropriate.

The recording medium 23 is configured using, for example, a memory card attached from the outside of the imaging apparatus 1. The recording medium 23 is removably attached to the imaging apparatus 1 through the memory I/F 24. A reader/writer adapted to the kind of the recording medium 23 writes image data processed by the image processor 16 and the image compressor/expander 19 into the recording medium 23 and reads out image data recorded on the recording medium 23. The recording medium 23 may output an imaging program and a variety of information to the Flash memory 26 through the memory I/F 24 and the bus 2B.

The SDRAM 25 is configured using a volatile memory. The SDRAM 25 has a function as a primary storage for temporarily storing image data input from the A/D converter 15 through the bus 2B, the processed image data input from the image processor 16, and information being processed in the imaging apparatus 1. For example, the SDRAM 25 temporarily stores image data successively output frame by frame by the imaging device 12 through the signal processor 14, the A/D converter 15, and the bus 2B.

The Flash memory 26 is configured using a nonvolatile memory. The Flash memory 26 has a program recording unit 261, a table recording unit 262, and a feature information recording unit 263. The program recording unit 261 records a variety of programs for operating the imaging apparatus 1, an imaging program and a variety of data to be used during execution of the program, and a variety of parameters necessary for the operation of image processing by the image processor 16.

The table recording unit 262 records a table for providing reference information for determining an effective region in which multi-recording (MR) can be executed in accordance with a focal length and a diaphragm created using information received from the lens unit 3.

FIG. 2 is a diagram illustrating an overview of the table recorded by the table recording unit 262. The table Tb illustrated in FIG. 2 provides an image height of an effective region in accordance with a diaphragm value and a focal length. For example, an effective region in a case where a diaphragm is F2.8 and a focal length is 28 millimeters has an image height of 0.8 (the distance from the center of the screen is 80% of the distance to the diagonal end). An effective region in a case where a diaphragm is F2.8 and a focal length is 58 millimeters has an image height of 1.0, that is, full-screen.

In general, the characteristics of a lens depend on shooting conditions such as the focal length and the diaphragm, and are not always good on the periphery of the screen. Specifically, in circumstances in which the optical performance on the periphery is degraded, a multi-recording effective region is displayed to the user such that this degraded region is not used as a candidate region to be selected for multi-recording (hereinafter, simply referred to as a candidate region). The table Tb is referred to by the imaging apparatus 1 (more specifically, an effective region determination unit 292 described later) in order to determine an MR effective region that is an effective region in which a determined sub-area to be cut (extracted) from an image can be set. Although FIG. 2 provides a table for determining an effective region in accordance with a focal length and a diaphragm, a table may be created such that the distance to the subject is included into the conditions.

The feature information recording unit 263 records feature information in the selected candidate region. In a case where a person's face is included in the candidate region, the feature information is feature information of the face (for example, the positions and sizes of eyes, mouth, nose, and eyebrows). If a person's face is not included in the candidate region, the feature information is information of a characteristic color included in the candidate region.

The main body communication unit 27 is a communication interface for communicating with the lens unit 3 attached to the main body 2. The main body communication unit 27 also includes an electrical contact with the lens unit 3.

The second communication unit 28 is an interface for communicating with the accessory 4 attached to the main body 2. The second communication unit 28 also includes an electrical contact with the accessory 4. FIG. 1 illustrates a case where an electronic viewfinder is attached as the accessory 4. The accessory 4 therefore has a communication unit 41 serving as a communication interface with the main body 2 and an ocular display 42 for displaying image information received through the communication unit 41. An accessory other than an electronic viewfinder can also be attached to the main body 2. Examples of the accessory include an electronic flash for projecting supplementary light.

The controller 29 is configured using, for example, a central processing unit (CPU). The controller 29 has a face detection unit 291 for detecting a person's face included in the shot image, an effective region determination unit 292 for determining an MR effective region in the screen by referring to the table recorded by the table recording unit 262, a touch detection unit 293 for detecting a touch position in accordance with a signal received from the touch panel 201, and a display control unit 294 for controlling a display manner of the display 21. The controller 29 centrally controls the operation of the imaging apparatus 1 by sending a control signal and various data to each unit that constitutes the imaging apparatus 1 through the bus 2B.

The effective region determination unit 292 generates reference information for determining an MR effective region based on the lens characteristic information (the characteristic information of an optical system 31) received from the lens unit 3 and writes the reference information as a table into the table recording unit 262 for recording.

When a signal to start a shooting operation is input from the input unit 20, the controller 29 performs control to start a shooting operation. Here, the shooting operation refers to an operation performed by the signal processor 14, the A/D converter 15, and the image processor 16 on the image data output by the imaging device 12 driven by the shutter driver 11 and the imaging device driver 13. The processed image data in this manner is compressed in a predetermined format by the image compressor/expander 19 under the control of the controller 29 and is recorded on the recording medium 23 through the bus 2B and the memory I/F 24. Besides the recording medium 23, a predetermined recording region may be reserved in the inside of the imaging apparatus 1, and the compressed image data may be stored in this recording region.

The main body 2 having the configuration described above may be further provided, for example, with an audio input/output unit, a supplementary light emission unit for emitting supplementary light (flash) to a subject, and a communication unit having a function for interactive communication with an external device via the Internet.

Next, a configuration of the lens unit 3 will be described. The lens unit 3 includes an optical system 31, a lens driver 32, a diaphragm 33, a diaphragm driver 34, a lens operating unit 35, a lens Flash memory 36, a lens communication unit 37, and a lens controller 38.

The optical system 31 is configured using one or more lenses. The optical system 31 collects light from a predetermined field of view. The optical system 31 has an optical zoom function of changing an angle of view and a focus function of changing a focal point.

The lens driver 32 is configured using, for example, a DC motor or a stepping motor to change a focus position and an angle of view of the optical system 31 by moving the lens of the optical system 31 on an optical axis L.

The diaphragm 33 adjusts exposure by limiting the quantity of incident light collected by the optical system 31.

The diaphragm driver 34 is configured using, for example, a stepping motor to drive the diaphragm 33.

The lens operating unit 35 is, for example, a ring provided to surround a lens barrel of the lens unit 3 and accepts input of an operation signal to start the operation of optical zoom in the lens unit 3, or input of an instruction signal to adjust a focus position in the lens unit 3. The lens operating unit 35 may be, for example, a push-type switch.

The lens Flash memory 36 has a lens characteristic information recording unit 361 for recording information about the optical characteristics of the optical system 31. The lens Flash memory 36 records a control program and a variety of parameters for determining the position and motion of the optical system 31.

Figure 3:
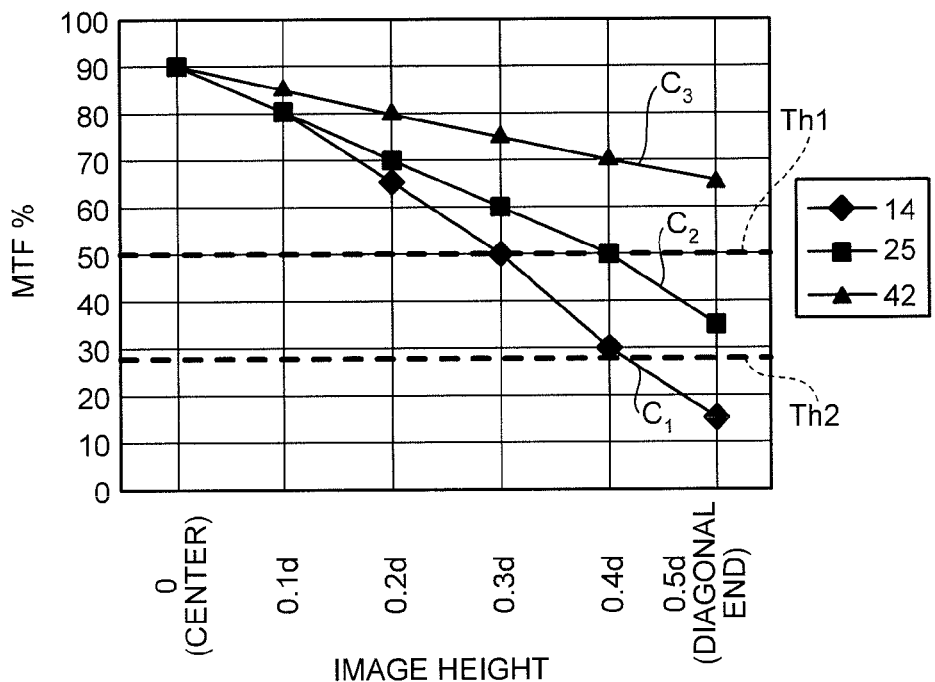
FIG. 3 is a diagram illustrating an overview of information (first example) recorded by a lens unit of the imaging apparatus according to the embodiment of the present invention.
Figure 4:
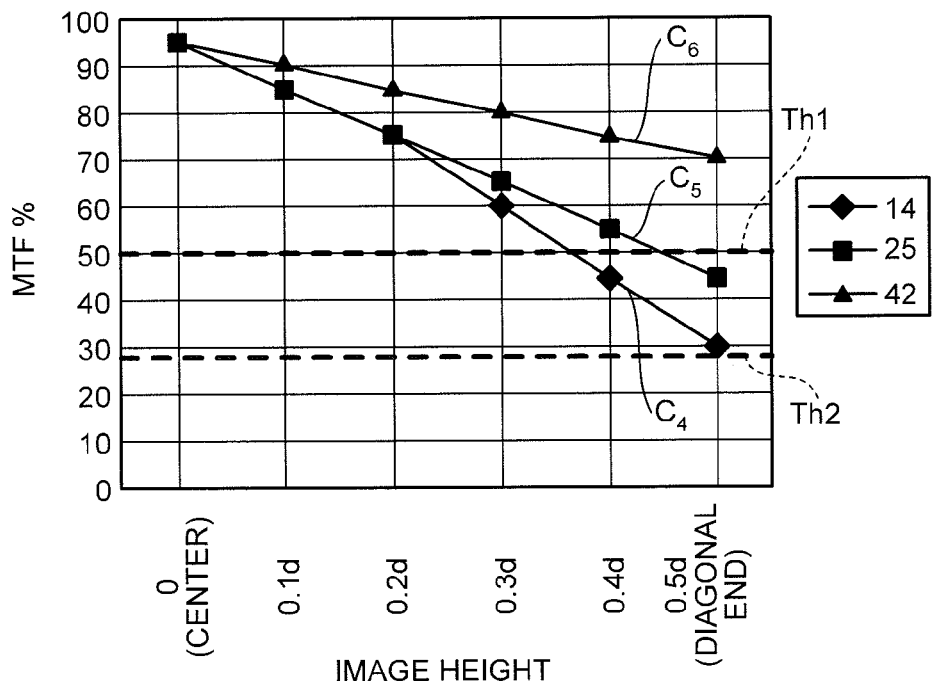
FIG. 4 is a diagram illustrating an overview of information (second example) recorded by the lens unit of the imaging apparatus according to the embodiment of the present invention.

FIG. 3 and FIG. 4 are diagrams schematically illustrating an overview of information recorded by the lens characteristic information recording unit 361. The lens characteristic information recording unit 361 records information about a modulation transfer function (hereinafter, referred to as "MTF") as an optical characteristic. Specifically, the lens characteristic information recording unit 361 records the relation between the MTF and the image height in accordance with a focal length and a diaphragm. It is noted that the relation illustrated in FIG. 3 and FIG. 4 is given only by way of example.

FIG. 3 illustrates the relation in a case where the diaphragm is F2.8, and FIG. 4 illustrates the relation in a case where the diaphragm is F5.6. In FIG. 3, curves $C_1$, $C_2$, and $C_3$ give the relation between the MTF and the image height in the cases where focal lengths are 14 millimeters, 25 millimeters, and 42 millimeters, respectively. In FIG. 4, curves $C_4$, $C_5$, and $C_6$ give the relation between the MTF and the image height in the cases where the focal lengths are 14 millimeters, 25 millimeters, and 42 millimeters, respectively.

First, the case where the diaphragm is F2.8 will be specifically described.

With the focal length of 14 millimeters (curve $C_1$), the MTF is 90% when the image height is 0, the MTF is 80% when the image height is 0.1 d, the MTF is 65% when the image height is 0.2 d, the MTF is 50% when the image height is 0.3 d, the MTF is 30% when the image height is 0.4 d, and the MTF is 15% when the image height is 0.5 d (diagonal end).

With the focal length of 25 millimeters (curve $C_2$), the MTF is 90% when the image height is 0, the MTF is 80% when the image height is 0.1 d, the MTF is 70% when the image height is 0.2 d, the MTF is 60% when the image height is 0.3 d, the MTF is 50% when the image height is 0.4 d, and the MTF is 35% when the image height is 0.5 d (diagonal end).

With the focal length of 42 millimeters (curve $C_3$), the MTF is 90% when the image height is 0, the MTF is 85% when the image height is 0.1 d, the MTF is 80% when the image height is 0.2 d, the MTF is 75% when the image height is 0.3 d, the MTF is 70% when the image height is 0.4 d, and the MTF is 65% when the image height is 0.5 d (diagonal end).

Next, the case where the diaphragm is F5.6 will be specifically described.

With the focal length of 14 millimeters (curve $C_4$), the MTF is 95% when the image height is 0, the MTF is 85% when the image height is 0.1 d, the MTF is 75% when the image height is 0.2 d, the MTF is 60% when the image height is 0.3 d, the MTF is 45% when the image height is 0.4 d, and the MTF is 30% when the image height is 0.5 d (diagonal end).

With the focal length of 25 millimeters (curve $C_5$), the MTF is 95% when the image height is 0, the MTF is 85% when the image height is 0.1 d, the MTF is 75% when the image height is 0.2 d, the MTF is 65% when the image height is 0.3 d, the MTF is 55% when the image height is 0.4 d, and the MTF is 45% when the image height is 0.5 d (diagonal end).

With the focal length of 42 millimeters (curve $C_6$), the MTF is 95% when the image height is 0, the MTF is 90% when the image height is 0.1 d, the MTF is 85% when the image height is 0.2 d, the MTF is 80% when the image height is 0.3 d, the MTF is 75% when the image height is 0.4 d, and the MTF is 70% when the image height is 0.5 d (diagonal end).

In FIG. 3 and FIG. 4, threshold values Th1 and Th2 are threshold values for determining an effective region when the number of recording pixels is 16 megapixels and 9 megapixels, respectively. The region where the threshold value is exceeded is determined as an effective region. In general, the greater the number of recording pixels is, the greater the threshold value of MTF is. This is because the threshold value of MTF has a correlation with a Nyquist frequency determined in accordance with the number of recording pixels.

In the present embodiment, it is assumed that, only one of the sagittal direction and the meridional direction of a spot image formed through the optical system 31 whose performance variation is greater is recorded by the lens characteristic information recording unit 361. The characteristics of both directions may, however, be recorded.

The lens communication unit 37 is a communication interface for communicating with the main body communication unit 27 of the main body 2 when the lens unit 3 is attached to the main body 2. The lens communication unit 37 also includes an electrical contact with the main body 2.

The lens controller 38 is configured using, for example, a central processing unit (CPU). The lens controller 38 controls the operation of the lens unit 3 in response to an operation signal of the lens operating unit 35 or an instruction signal from the main body 2. The lens controller 38 operates in cooperation with the main body 2 by transmitting/receiving a lens communication signal to/from the controller 29 of the main body 2 at predetermined intervals. Specifically, the lens controller 38 drives the lens driver 32 in response to an operation signal of the lens operating unit 35 included in the lens communication signal to perform focusing of the lens unit 3 and a zoom change, and also drives the diaphragm driver 34 to change a diaphragm value. With the lens unit 3 attached to the main body 2, the lens controller 38 transmits the lens characteristic information, the focus position information, the focal length, and unique information for identifying the lens unit 3, for example, to the main body 2.

Figure 5:
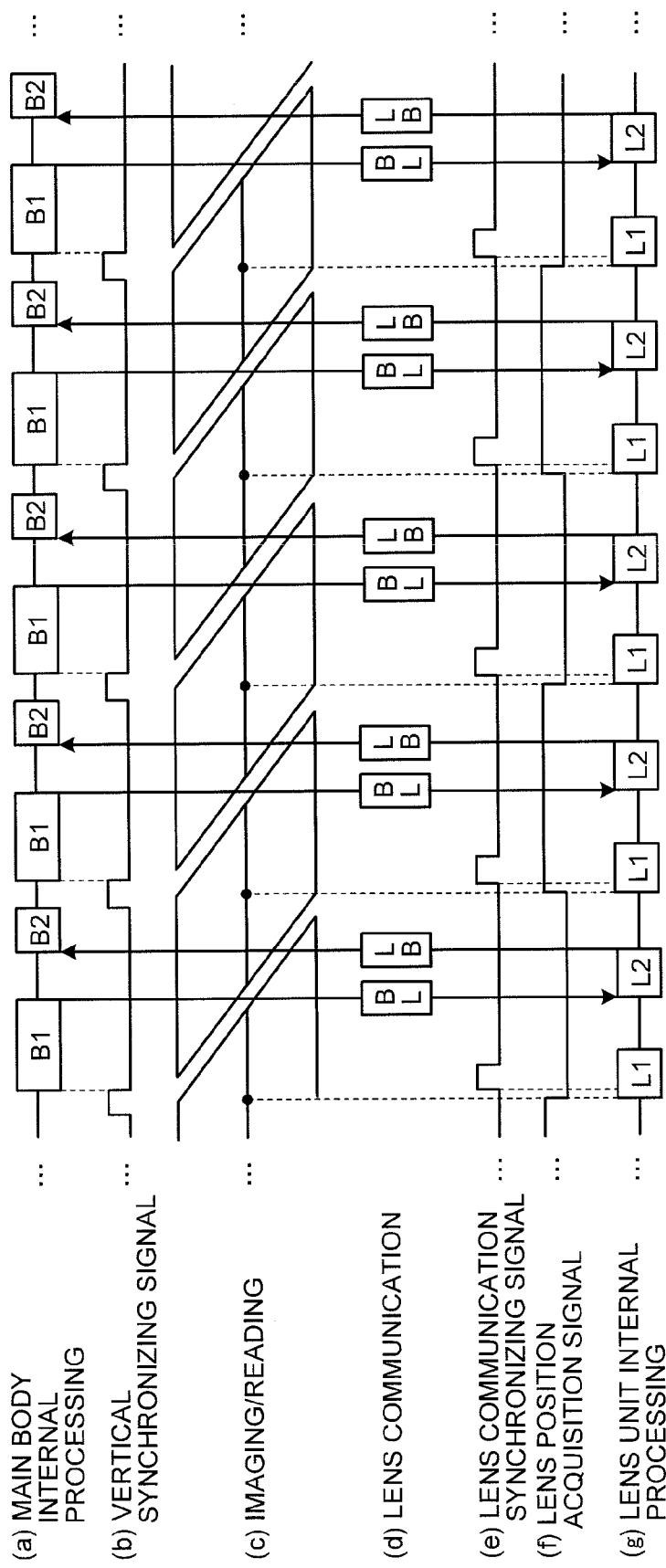
FIG. 5 is a timing chart illustrating an example of synchronized communication between a controller and a lens controller of the imaging apparatus according to the embodiment of the present invention.

FIG. 5 is a timing chart illustrating an example of synchronized communication between the controller 29 and the lens controller 38. A first line (a) indicates processing inside the main body 2. A second line (b) indicates a vertical synchronizing signal. A third line (c) indicates the timing of imaging and reading. A fourth line (d) indicates lens communication. A fifth line (e) indicates a lens communication synchronizing signal. A sixth line (f) indicates a lens position acquisition signal. A seventh (last) line (g) indicates processing inside the lens unit 3.

First, the controller 29 causes the image processor 16 to execute image processing of a live view image and calculation of an AF evaluation value using the image data acquired in the previous frame and transmits a lens status data request command for acquiring lens status data to the lens controller 38 (B1, BL). Here, the controller 29 transmits a synchronizing signal for lens communication and a lens position acquisition signal to specify a timing to acquire the positional information of the optical system 31, at the same cycle as the vertical synchronizing signal during the synchronized communication mode. This lens position acquisition signal is a signal whose state changes when half the accumulation time at the center of the imaging device 12 has elapsed as in the third line (c) in FIG. 5.

The lens controller 38 acquires the positional information of the optical system 31 at a timing when the state of the lens position acquisition signal changes, and detects the operating state of the lens operating unit 35 at a reception timing of the lens communication synchronizing signal (L1).

Then, the lens controller 38 transmits to the controller 29 the lens status data acquired at Step L1, including the positional information of the optical system 31 and the operating state of the lens operating unit 35, as a response to the lens status data request command received from the controller 29 (L2).

The controller 29 thereafter performs calculation of an AF evaluation value and various setting changes including changing the exposure value, based on the lens status data sent from the lens controller 38 (B2).

Figure 6:
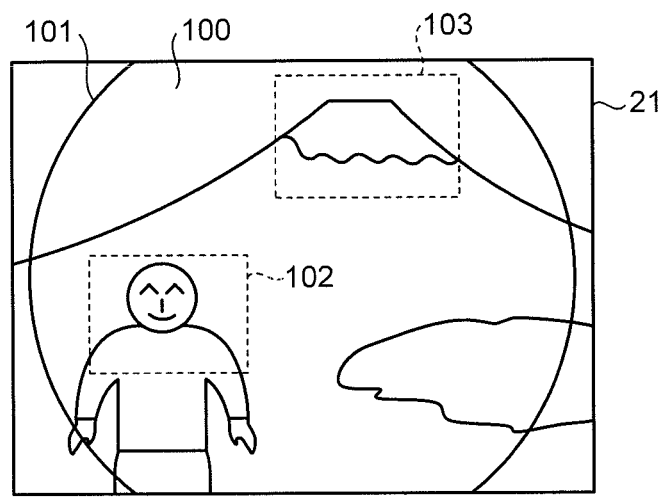
FIG. 6 is a diagram illustrating features of a multi-recording process performed by the imaging apparatus according to the embodiment of the present invention.

FIG. 6 is a diagram for explaining the features of the multi-recording process performed by the imaging apparatus 1 having the configuration above. In FIG. 6, a live view image 100 is displayed on the display 21. In this state, a cut frame 101 indicating the boundary of the MR effective region is displayed on the display 21. This cut frame 101 is set by referring to the table Tb for effective region determination that is created based on the lens characteristic information received by the main body 2 from the lens unit 3.

In FIG. 6, rectangular regions 102 and 103 are displayed. These rectangular regions 102 and 103 are regions set by the user touching the touch panel 201 on the display 21 as candidate regions (determined sub-areas). In this manner, in the imaging apparatus 1, a plurality of candidate regions can be selected from the entire image, and the selected candidate regions can be cut for multi-recording along with the entire image. The rectangular regions 102 and 103 can be set by, besides touching the touch panel 201, operating another switch, button, or the like included in the input unit 20.

Figure 7:
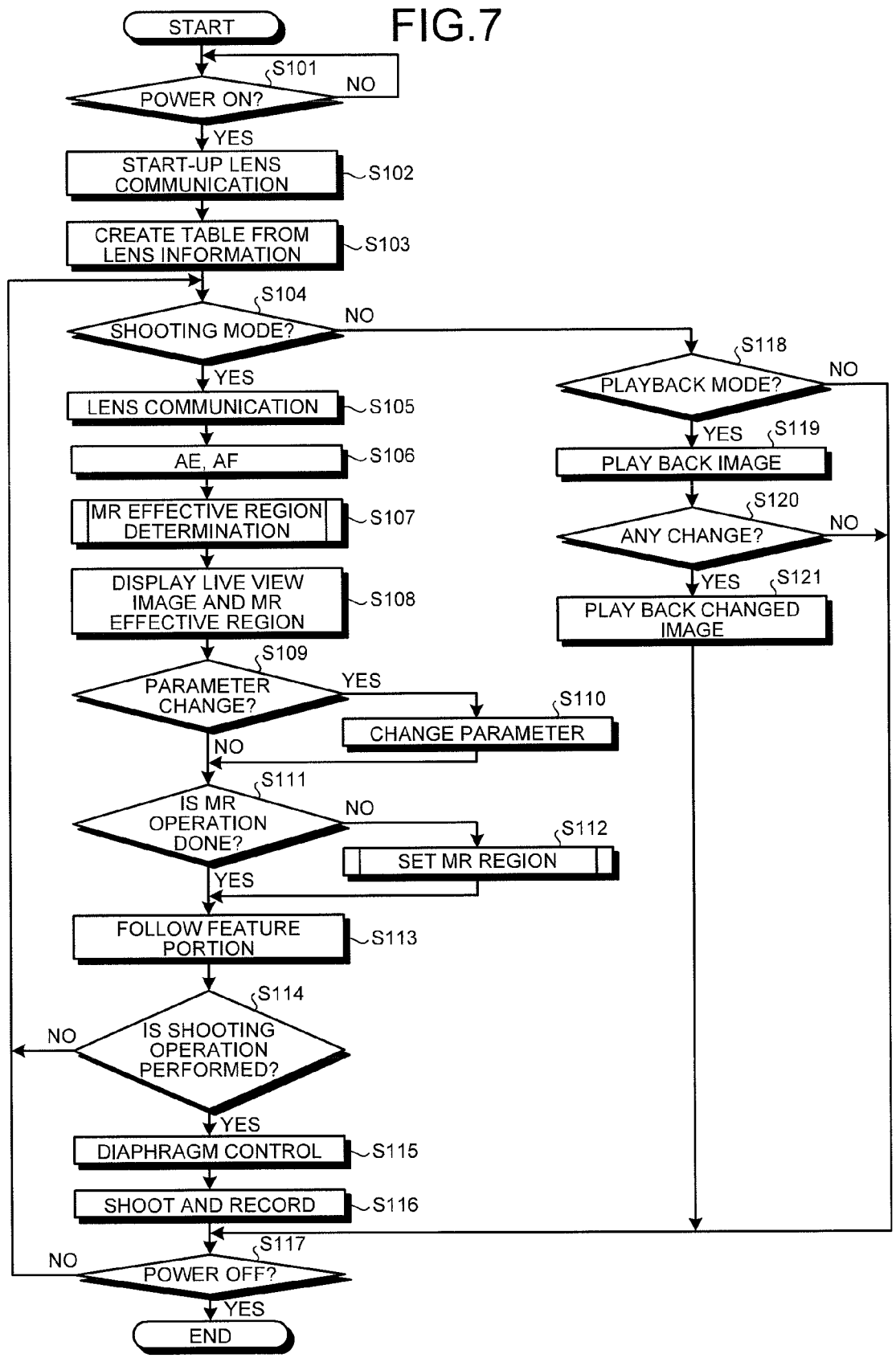
FIG. 7 is a flowchart illustrating an overview of a process performed by the imaging apparatus according to the embodiment of the present invention.

FIG. 7 is a flowchart illustrating an overview of a process performed by the imaging apparatus 1. First, the controller 29 determines whether the main body 2 is powered on (Step S101). If the power is on (Yes at Step S101), the imaging apparatus 1 proceeds to Step S102. On the other hand, if the power is not on (No at Step S101), the imaging apparatus 1 repeats Step S101.

The imaging apparatus 1 then performs start-up lens communication between the main body 2 and the lens unit 3 (Step S102). In this lens communication, the lens unit 3 transmits the lens characteristic information to the main body 2.

Thereafter, the effective region determination unit 292 creates a table (reference information) for effective region determination based on the lens characteristic information received from the lens unit 3 (Step S103).

The controller 29 then determines whether the imaging apparatus 1 is set to the shooting mode (Step S104). As a result of the determination, if the shooting mode is set (Yes at Step S104), lens communication is performed between the main body 2 and the lens unit 3 (Step S105), and the AE process by the AE processor 17 and the AF process by the AF processor 18 are performed based on the communication result (Step S106). The lens communication at Step S105 is performed, for example, as explained with reference to FIG. 5.

Figure 8:
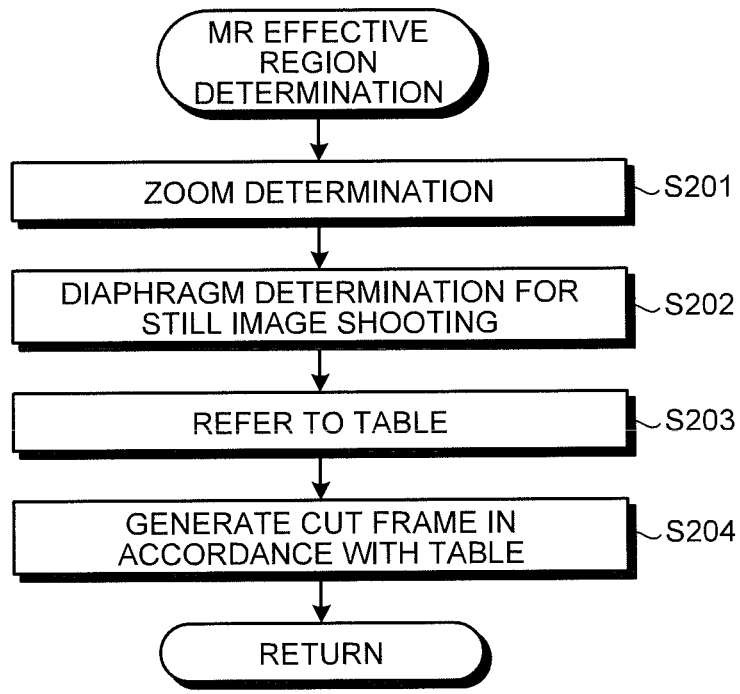
FIG. 8 is a flowchart illustrating an overview of a multi-recording effective region determination process performed by the imaging apparatus according to the embodiment of the present invention.

The imaging apparatus 1 then performs MR effective region determination (Step S107). FIG. 8 is a flowchart illustrating an overview of the MR effective region determination process performed by the imaging apparatus 1. First, the effective region determination unit 292 performs zoom determination (Step S201) and performs diaphragm determination for still image shooting (Step S202).

The effective region determination unit 292 then refers to the table recorded by the table recording unit 262 (Step S203) and generates information of a cut frame to be cut as an effective region.

Thereafter, the cut processing unit 161 generates a cut frame to be displayed in the image based on the information of a cut frame that is generated by the effective region determination unit 292 (Step S204). The MR effective region determination process thus ends.

Figure 9:
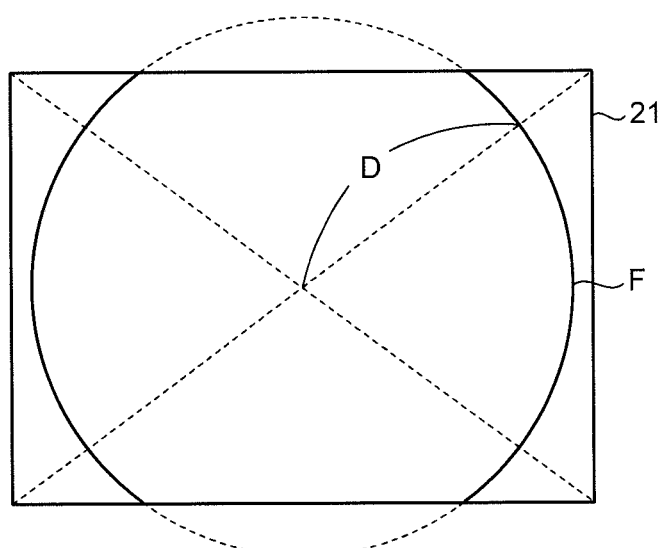
FIG. 9 is a diagram illustrating a setting example of a cut frame on the display.

After the MR effective region determination process at Step S107, the display control unit 294 performs control to cause the display 21 to display the live view image and the MR effective region (Step S108). FIG. 9 is a diagram illustrating an example of display of a cut frame. A cut frame F is shaped such that a circle having an image height D is cut on the screen on the display 21. The image height D is, for example, provided by the table Tb illustrated in FIG. 2 and determined in accordance with the diaphragm value and the focal length. In a case where a combination of a diaphragm value and a focal length is not provided in the table Tb, the image height may be determined by linear interpolation using an approximate value, or the image height may be determined using the closest value in the table Tb.

Then, if an imaging parameter is changed through the input unit 20 (Yes at Step S109), the controller 29 changes the parameter (Step S110) and proceeds to Step S111. If an imaging parameter is not changed at Step S109 (No at Step S109), the imaging apparatus 1 directly proceeds to Step S111.

At Step S111, if MR operation is not being performed (No at Step S111), the imaging apparatus 1 performs an MR region setting process (Step S112).

Figure 10:
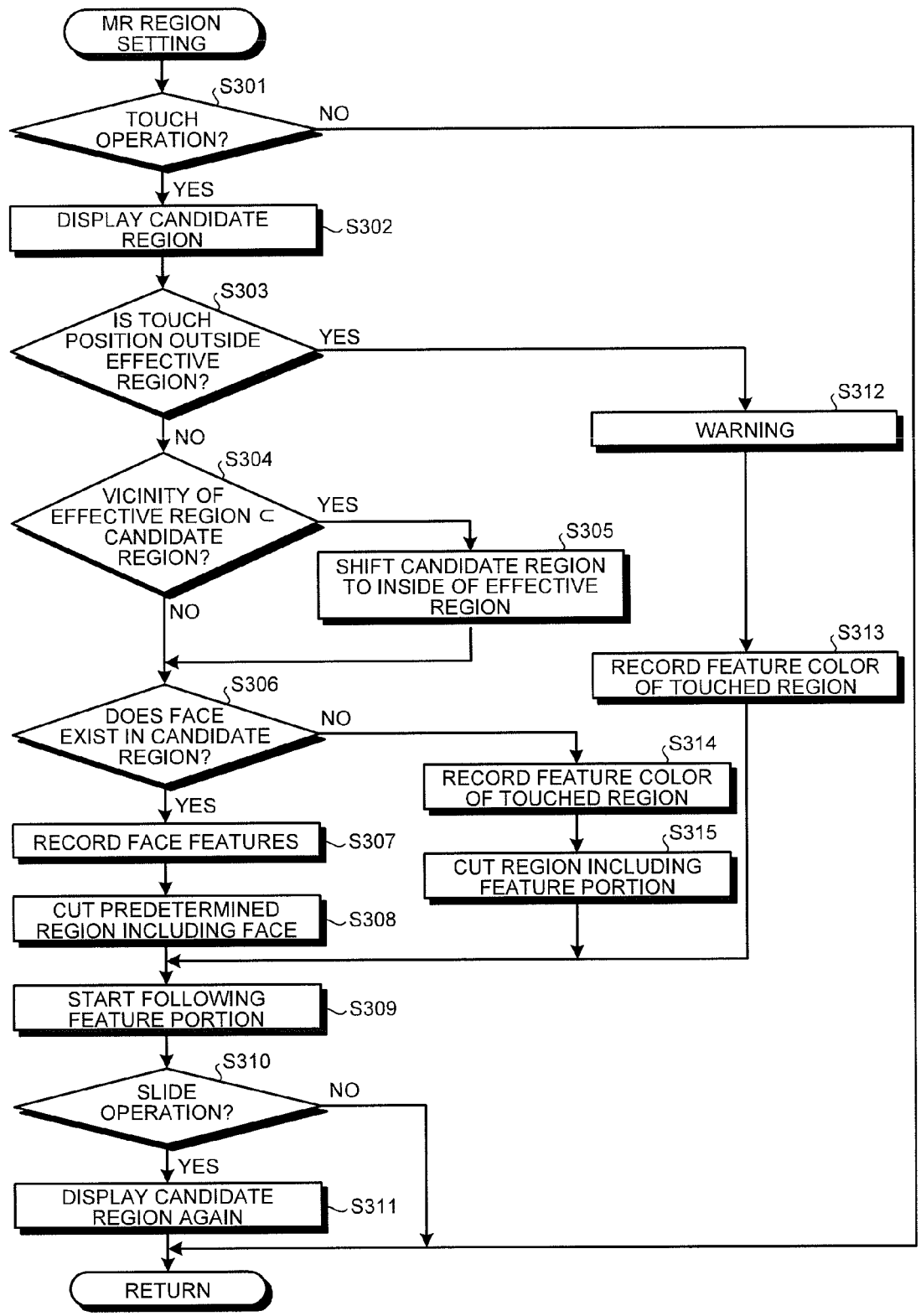
FIG. 10 is a flowchart illustrating an overview of a multi-recording region setting process performed by the imaging apparatus according to the embodiment of the present invention.

FIG. 10 is a flowchart illustrating an overview of the MR region setting process. First, if the touch detection unit 293 detects a touch input operation on the touch panel 201 (Yes at Step S301), the display control unit 294 causes the display 21 to display a candidate region (Step S302).

Thereafter, if the touch position is not outside the effective region (No at Step S303), if the vicinity of the effective region is included in the candidate region (Yes at Step S304), the display control unit 294 shifts the candidate region to the inside of the effective region for display (Step S305). Movement may be restricted so that the candidate region is displayed within the effective region, rather than shifting the candidate region into the inside of the effective region.

Figure 11:
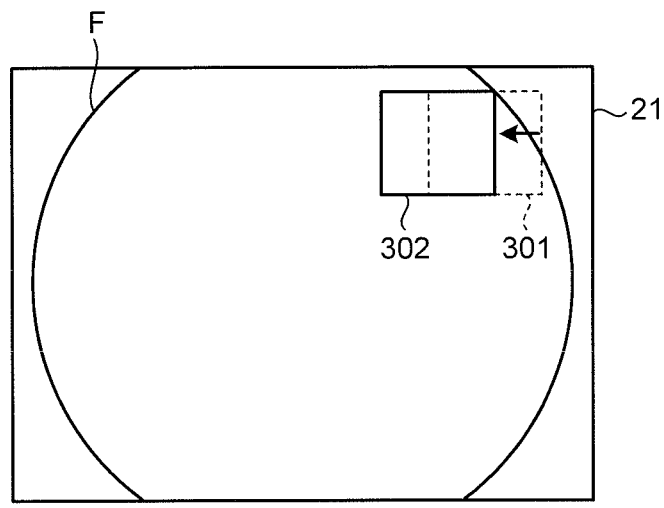
FIG. 11 is a diagram schematically illustrating an overview of a process performed by the imaging apparatus for shifting a candidate region into an effective region according to the embodiment of the present invention.

FIG. 11 is a diagram schematically illustrating an overview of the shift process at Step S305. In FIG. 11, the touch position of an initial candidate region 301 is included in the effective region (the inside of the cut frame F) but the upper right portion thereof partially extends into the neighboring region outside the cut frame F. A new candidate region 302 is therefore displayed such that the candidate region as a whole is shifted leftward to be entirely included within the effective region.

After Step S305, if the face detection unit 291 detects a face within the candidate region (Yes at Step S306), the features of the detected face are recorded in the Flash memory 26 (Step S307). Here, the feature data of the face is information, for example, about the height and width of the face, the positions of the eyes, mouth, nose, and eyebrows.

Figure 12:
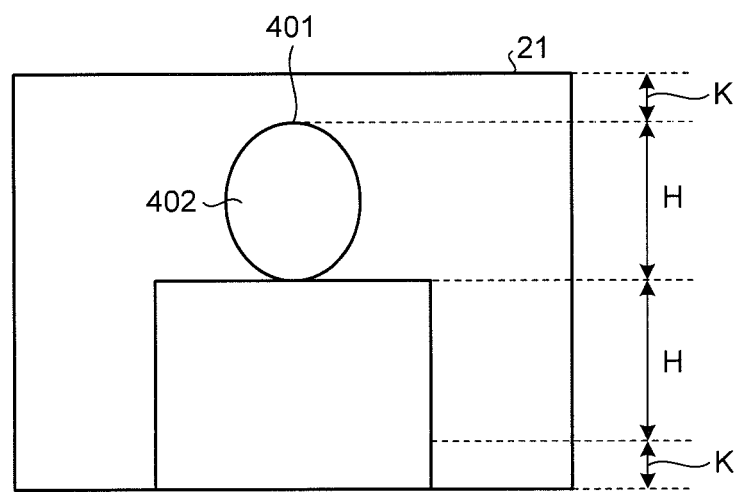
FIG. 12 is a diagram illustrating an overview of a process performed by the imaging apparatus for cutting a predetermined region including a face according to the embodiment of the present invention.

The cut processing unit 161 then cuts a predetermined region including the face (Step S308). FIG. 12 is a diagram illustrating a cut example of a predetermined region including the face. In FIG. 12, cutting is performed with a predetermined aspect ratio on the basis of the height H of a face 402 of a subject 401. Specifically, the cut processing unit 161 cuts an image that includes a part below the face 402 with a height equal to the height H of the face 402 serving as a basis and extends upward and downward by a value K determined based on the height of the face 402.

Thereafter, the imaging apparatus 1 starts following the feature portion in the candidate region designated through the MR operation (Step S309). Specifically, if the face is included in the candidate region, the face is followed.

Thereafter, if the touch detection unit 293 detects a slide operation on the touch panel 201 (Yes at Step S310), the display control unit 294 causes the display 21 to redisplay a candidate region in accordance with the slide end position (Step S311). On the other hand, if the touch detection unit 293 does not detect a slide operation on the touch panel 201 (No at Step S310), the imaging apparatus 1 terminates the MR region setting process.

At Step S303, if the touch position is outside the effective region (Yes at Step S303), the display control unit 294 causes the display 21 to display a warning (Step S312). The warning here is, for example, a message "Outside the Effective Region. Designate Again."

After Step S312, the controller 29 records a feature color of the touched region (Step S313). The feature color here may be, for example, the color of the largest area in the touch region. The imaging apparatus 1 thereafter proceeds to Step S309. In this case, at Step S309, the imaging apparatus 1 starts following a portion having the feature color as a feature portion.

At Step S304, if the vicinity of the effective region is not included in the candidate region (No at Step S304), the imaging apparatus 1 proceeds to Step S306.

At Step S306, if no face exists in the candidate region (No at Step S306), the controller 29 records the feature color of the touched region (Step S314). The processing here is similar to that of Step S313 described above.

After Step S314, the cut processing unit 161 performs a process of cutting a predetermined region including the feature color (Step S315). Specifically, the cut processing unit 161 performs cutting with a predetermined aspect ratio such that the feature color portion is located at the center of the screen. The imaging apparatus 1 thereafter proceeds to Step S309. The feature portion in this case is the portion having the feature color.

After the MR region setting process at Step S112 as described above, the controller 29 follows the feature portion (Step S113). The feature portion here is a face or a feature color portion as explained in the MR region setting process. If MR operation is being performed at Step S111 (Yes at Step S111), the imaging apparatus 1 directly proceeds to Step S113.

Then, if a shooting operation is performed (Yes at Step S114), the controller 29 performs control to set a diaphragm value determined based on the process at Steps S106 to S112 (Step S115). The imaging apparatus 1 then shoots an image and records the shot image into the recording medium 23 (Step S116).

After Step S116, if an operation to turn off the power is performed (Yes at Step S117), the imaging apparatus 1 terminates a series of processing. On the other hand, if an operation to turn off the power is not performed (No at Step S117), the imaging apparatus 1 returns to Step S104.

Next, the case where the controller 29 determines that the shooting mode is not set at Step S104 will be described (No at Step S104). In this case, when a playback mode is set (Yes at Step S118), the display control unit 294 plays back a predetermined image (Step S119).

Thereafter, if an instruction to change the playback image is input through the input unit 20 (Yes at Step S120), the display control unit 294 changes the image according to the change instruction and plays back the changed image (Step S121). On the other hand, if an instruction to change the playback image is not input through the input unit 20 (No at Step S120), the imaging apparatus 1 proceeds to Step S117.

If the playback mode is not set at Step S118 (No at Step S118), the imaging apparatus 1 proceeds to Step S117.

In the flowchart illustrated in FIG. 7, the lens unit 3 transmits the lens characteristic information to the main body 2 during start-up lens communication after the power is turned on. The transmission timing for the lens unit 3 to transmit the lens characteristic information to the main body 2 is, however, not limited thereto. For example, the transmission timing may be at lens communication immediately after the shooting mode is entered.

Alternatively, the main body 2 may transmit a transmission request for the lens characteristic information to the lens unit 3 immediately after touch operation is performed for selecting the MR effective region, and the lens unit 3 may transmit the lens characteristic information in response.

The embodiment of the present invention as described above includes the effective region determination unit for determining an effective region in which a determined sub-area can be set through input of a signal from the input unit, based on the characteristic information of the optical system in accordance with the shooting conditions, and the display control unit for causing the display to display information indicating the boundary of the effective region in accordance with the result of determination by the effective region determination unit. The user can therefore set a determined sub-area based on the characteristic information of the optical system. Accordingly, a plurality of images with excellent image quality can be generated from one image irrespective of the shooting conditions.

Although a mode for carrying out the invention has been described so far, the present invention should not be limited only by the foregoing embodiment. For example, as a modification of the embodiment, an MTF performance polynomial may be provided as the lens characteristic information. The MTF performance polynomial is given by the following equation:

$$\text{MTF}=F_1x+F_2x^2+\ldots+B_1y+B_2y^2+\ldots+C$$

where x is a focal length and y is a diaphragm (F-number). Here, "..." following $F_2x^2$ represents a third or higher degree term of x, and "..." following $B_2y^2$ represents a third or higher degree term of y. In this case, the lens unit 3 transmits the coefficient of the MTF polynomial to the main body 2. The main body 2 creates a table for MR effective region setting based on the coefficient of the MTF polynomial received from the lens unit 3.

As a modification of the embodiment, the table for effective region determination (the table Tb illustrated in FIG. 2) may be recorded in the lens unit 3, and when the lens unit 3 is attached to the main body 2, the table may be transmitted to the main body 2.

As a further modification of the embodiment, quantities other than MTF, such as image distortion characteristic information, may be applied as the lens characteristic information. Specifically, an error (the amount of aberration, spot size) in consideration of the reference wavelength and other wavelengths may be applied, or the resolution (spatial frequency) in accordance with the number of pixels and the lens performance may be applied.

Figure 13:
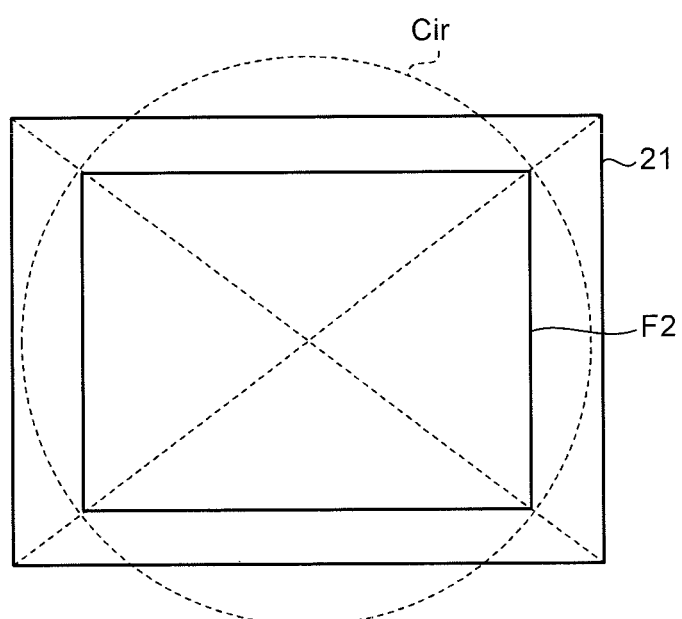
FIG. 13 is a diagram illustrating another setting example of a cut frame on the display.

The shape of the cut frame indicating the boundary of the MR effective region is not limited to the one illustrated in FIG. 9. FIG. 13 is a diagram illustrating another setting example of the cut frame. In the case illustrated in FIG. 13, a rectangular cut frame F2 inscribed in a circle Cir whose radius is the image height defined by the table recorded by the table recording unit 262 is displayed on the display 21. The information indicating the boundary of the MR effective region, such as a cut frame, is displayed as necessary and is not necessarily displayed all the time.

Figure 14:
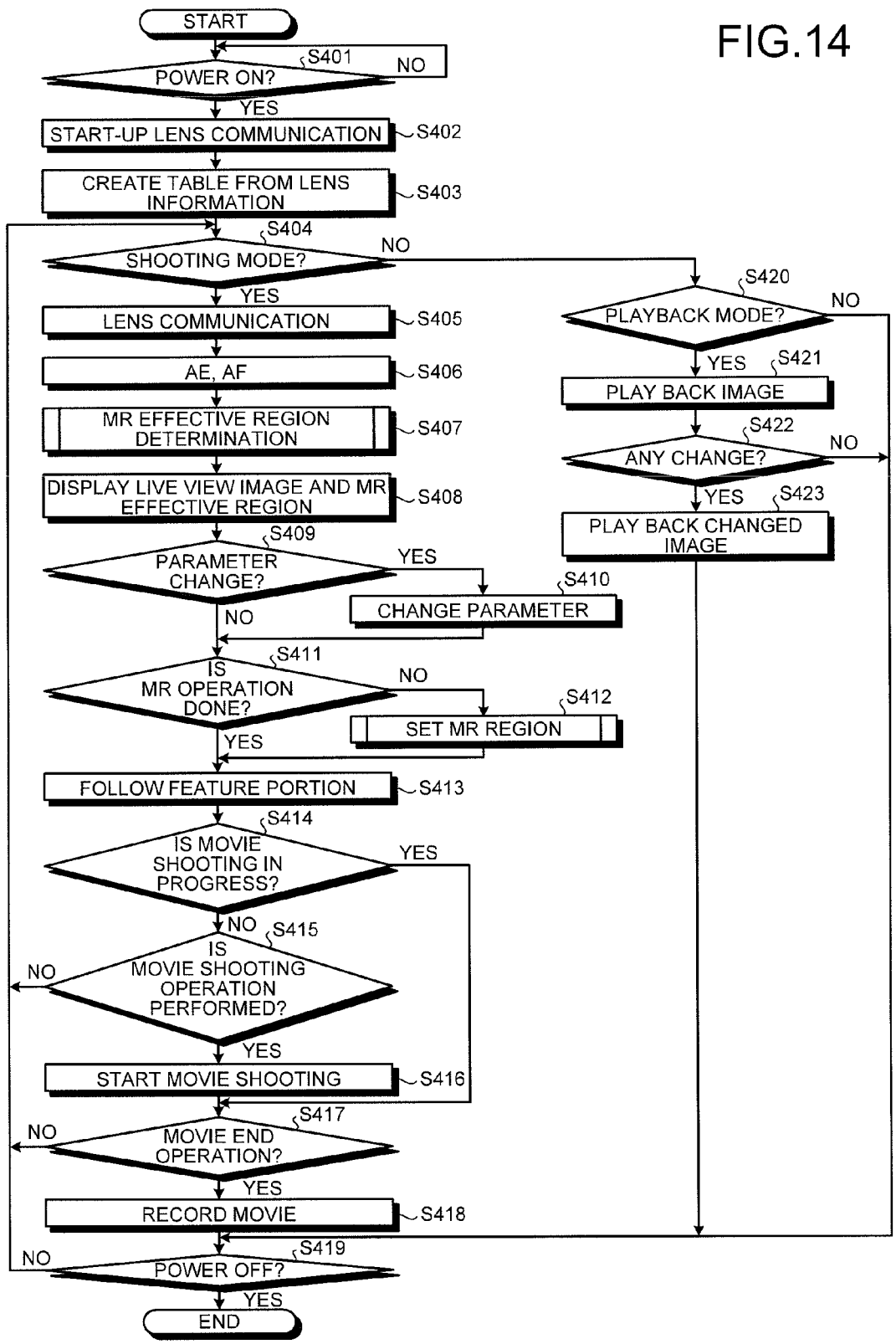
FIG. 14 is a flowchart illustrating an overview of a process in a case where the imaging apparatus shoots motion images according to the embodiment of the present invention.

The embodiment of the present invention is applicable not only to still image shooting but also to movie shooting. FIG. 14 is a flowchart illustrating an overview of a process of the imaging apparatus in the case of movie shooting. In FIG. 14, the process at Steps S401 to S413 corresponds to the process illustrated at Steps S101 to S113 illustrated in FIG. 7, respectively. The process following Step S413 will be described below.

At Step S414, if movie shooting is in progress (Yes at Step S414), the imaging apparatus 1 proceeds to Step S417 described later. On the other hand, if movie shooting is not in progress (No at Step S414), the imaging apparatus 1 proceeds to Step S415.

At Step S415, if a movie shooting operation is input (Yes at S415), the imaging apparatus 1 starts movie shooting (Step S416). On the other hand, if a movie shooting operation is not input (No at Step S415), the imaging apparatus 1 returns to Step S404.

After Step S416, if a movie end operation is input (Yes at Step S417), the imaging apparatus 1 records the shot movie (Step S418). On the other hand, if a movie end operation is not input (No at Step S417), the imaging apparatus 1 returns to Step S404.

Steps S419 to S423 correspond to the process at Steps S117 to S121 illustrated with reference to FIG. 7, respectively.

As a modification of the embodiment, the main body and the lens unit may be integrally formed.

The imaging apparatus according to the present invention can be applied not only to a digital single-lens reflex camera but also to, for example, a digital camera to which an accessory or the like can be attached, a digital camcorder, a mobile phone having a shooting function, and electronic equipment such as a tablet-type portable equipment.

In the explanation of the flowcharts in this specification, the time sequence of the steps in the process is explicitly illustrated using such expressions as "first," "thereafter," and "then." The order of the process necessary to carry out the invention is, however, not uniquely determined by these expressions. In other words, the order of the process in the flowcharts described in this specification can be changed in a range that does not cause any contradiction.

In this manner, the present invention may include various embodiments not described here and is susceptible to various design modifications within the scope of the technical concept specified by the claims.

Note 1. An interchangeable lens for an imaging apparatus capable of concurrently shooting an image displayed by a display and a determined sub-area designated in the image, the imaging apparatus including an imaging device that generates image data by photoelectrically converting light for image formation by an optical system of the lens, and a display that can display an image corresponding to the image data, the interchangeable lens comprising:

a transmission unit that transmits, to the imaging apparatus, characteristic information of the optical system for causing the display to display information indicating an effective region of the cut when the lens is connected to the imaging apparatus.

Note 2. An imaging apparatus capable of concurrently shooting an image displayed by a display and a determined sub-area designated in the image, the imaging apparatus comprising:

an optical system that collects light from a subject for image formation;

an imaging device that generates image data by photoelectrically converting the light for image formation collected by the optical system;

a display that can display an image corresponding to the image data;

an effective region determination unit that determines an effective region that is capable of being cropped out in a screen, based on image distortion characteristic information of the optical system; and a display control unit that causes the display to display information indicating the effective region in accordance with a result of determination by the effective region determination unit.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus capable of concurrently shooting an image displayed by a display and a determined sub-area designated in the image, the imaging apparatus comprising:
   a) a lens using including
      an optical system that collects light from a subject for image formation, and
      a characteristic information recoding unit that records characteristic information of the optical system in accordance with a shooting condition; and
   b) a main body including
      an imaging device that generates image data by photoelectrically converting the light for image formation collected by the optical system,
      a display that can display an image corresponding to the image data,
      an input unit,
      an effective region determination unit that determines an effective region in which the determined sub-area can be set through input of a signal from the input unit, based on characteristic information of the optical system corresponding to a shooting condition, and
      a display control unit that causes the display to display information indicating the effective region in accordance with a result of determination by the effective region determination unit,
   wherein the lens unit is capable of communicating with the main body and being removably attached to the main body,
   wherein the effective region determination unit generates reference information for determining the effective region based on the characteristic information received from the lens unit, and
   wherein of the characteristic information, information that is capable of being used to generate the reference information varies depending on the number of recording pixels.

2. The imaging apparatus according to claim 1, wherein
   the shooting condition includes a condition concerning a focal length and a diaphragm, and
   the characteristic information has a value corresponding to a shot image height.

3. The imaging apparatus according to claim 2, wherein the characteristic information is any of a modulation transfer function, an error based on a wavelength, and a resolution.

4. The imaging apparatus according to claim 1, wherein when a part of the determined sub-area set through input of the signal from the input unit is not included in the effective region, the display control unit causes the display to display the determined sub-area shifted on a screen or restricted in movement so that the determined sub-area is entirely included within the effective region.

5. The imaging apparatus according to claim 1, wherein when an input position of the signal from the input unit is outside the effective region, the display control unit causes the display to display a warning.

6. The imaging apparatus according to claim 1, wherein the boundary of the effective region is determined by the reference information.

7. The imaging apparatus according to claim 1, wherein when a part of the determined sub-area set through input of the signal from the input unit is not included in the effective region, the display control unit causes the display to display the determined sub-area shifted on a screen so that the determined sub-area is entirely included within the effective region.

8. The imaging apparatus according to claim 1, wherein when an input position of the signal from the input unit is outside the effective region, the display control unit causes the display to display a warning.

9. A lens interchangeable imaging apparatus to which an interchangeable lens is removably attached, the imaging apparatus capable of concurrently shooting an image displayed by a display and a determined sub-area designated in the image, the lens interchangeable imaging apparatus comprising:
an imaging device that generates image data by photoelectrically converting light for image formation collected by an optical system of the interchangeable lens;
a display that can display an image corresponding to the image data;
an input unit;
an effective region determination unit that (1) acquires, from a communication unit of the interchangeable lens, characteristic information of the optical system for determining an effective region in which the determined sub-area can be set through input of a signal from the input unit, and (2) determines the effective region based on the acquired characteristic information of the optical system in accordance with a shooting condition; and
a display control unit that causes the display to display information indicating the effective region in accordance with a result of determination by the effective region determination unit.

10. An imaging method capable of concurrently shooting an image displayed by a display and a determined sub-area designated in the image, the imaging method comprising the steps of:
generating image data by photoelectrically converting light from an optical system that collects light from a subject;
displaying an image corresponding to the image data;
determining an effective region in which the determined sub-area can be set through a user's operation, based on characteristic information of the optical system corresponding to a shooting condition; and
causing the display to display information indicating the effective region in accordance with the effective region determined by the act of determining an effective region.

11. The imaging apparatus according to claim 1, wherein the effective region is smaller than the display.

12. The lens interchangeable imaging apparatus of claim 9, wherein the effective region is smaller than the display.

13. The imaging method of claim 10, wherein the effective region is smaller than the display.

14. The imaging apparatus according to claim 11, wherein the determined sub-area is based on a user touch input anywhere on the display.

15. The lens interchangeable imaging apparatus of claim 12, wherein the determined sub-area is based on a user touch input anywhere on the display.

16. The imaging method of claim 13 wherein the determined sub-area is based on a user touch input anywhere on the display.

* * * * *